Patented Nov. 29, 1949

2,489,695

UNITED STATES PATENT OFFICE 2,489,695

DIHYDROPYROGALLOL

Heinz Moritz Wuest, Upper Montclair, N. J., assignor to Hoffmann-La Roche Inc., Roche Park, Nutley, N. J., a corporation of New Jersey No Drawing. Application April 27, 1946,
Serial No. 665,637

1 Claim. (Cl. 260—586)

My invention relates to the novel compound dihydropyrogallol.

This compound is a member of the class of substances known as ene-diols. With ferric chloride solution, it produces a transient blue coloration which is characteristic of ene-diols. It has reducing and antioxidant properties. It can be quantitatively titrated with iodine solution and it decolorizes 2,6-dichlorphenol-indophenol.

Dihydropyrogallol is water soluble; it possesses acid properties, and forms salts with strong organic bases. The salts obtained, for example, from benzylamine, cyclohexylamine, dicyclohexylamine, and diethylamine, are good emulsifying agents. Such salts possess a combined emulsifying and anti-oxidant action which makes the product particularly useful for stabilizing and inhibiting oxidation of edible and technical emulsions. The product is useful as an antioxidant. It prevents the discoloration of fruit, such as sliced apples or peaches exposed to air. In small concentrations, the compound inhibits or delays the oxidation of solutions of sodium or calcium ascorbate or arsenobenzenes. The product is also useful as a stabilizer for pharmaceutical preparations. Since the ene-diol grouping in dihydropyrogallol has reducing properties, the substance is useful for developing photographic films, yielding fine-grained negatives.

The process, in general, involves the catalytic hydrogenation of pyrogallol in the presence of at least one equivalent of a strongly basic compound.

The following examples are presented to illustrate methods of preparing this new compound. The product may be prepared and used in either a pure or an impure state.

Example 1

To a solution of 320 g. of sodium hydroxide (8.0 moles) in two liters of water there were added one kilogram of pyrogallol and 50 g. of Raney nickel. Throughout this procedure, oxygen was excluded by means of a stream of nitrogen. The solution was then heated in an autoclave to 60° C. and stirred for five hours under a hydrogen pressure of 1000 p. s. i. The autoclave and contents were then permitted to cool. The nickel was filtered off, and the filtrate was poured into 675 ml. of ice-cold concentrated hydrochloric acid. Dihydropyrogallol precipitated as a light tan solid, which was filtered off after standing for thirty minutes at —50°, and dried. The dried product melted at 89–93°. By extraction of the mother liquors with ether, another fraction melting at 94–105° was obtained. The product was recrystallized from benzene and obtained in a form of white platelets melting at 109–112° C.

Example 2

110 g. of pyrogallol were dissolved in 200 cc. of water. To this, there were added 175 cc. of a 20% sodium hydroxide solution. This mixture was then hydrogenated with 7 g. of Raney nickel catalyst at 75° C. for twelve hours under a pressure of 1000 p. s. i. After filtration to separate the catalyst, the filtrate was acidified with concentrated hydrochloric acid. Upon cooling to 0° and stirring, crytals precipitated. These crystals were separated and recrystallized from chloroform yielding white platelets. Instead of chloroform, ethyl acetate was also found to be useful for this purpose.

It will be understood that the term dihydropyrogallol, as employed herein, embraces all the tautomeric forms.

I claim:
Dihydropyrogallol.

HEINZ MORITZ WUEST.

REFERENCES CITED

The following references are of record in the file of this patent:

Senderens Compt. rend., vol. 174, pages 616–618 (1922).

Lindeman Annalen, vol. 483, pages 31–43 (1930).

Certificate of Correction

Patent No. 2,489,695 November 29, 1949

HEINZ MORITZ WUEST

It is hereby certified that error appears in the printed specification of the above numbered patent requiring correction as follows:

Column 2, line 9, for "—50°" read —5°;

and that the said Letters Patent should be read with this correction therein that the same may conform to the record of the case in the Patent Office.

Signed and sealed this 21st day of March, A. D. 1950.

[SEAL]

THOMAS F. MURPHY,
*Assistant Commissioner of Patents.*